(12) United States Patent
Nielson et al.

(10) Patent No.: US 7,604,417 B2
(45) Date of Patent: Oct. 20, 2009

(54) EXPANDED BEAM CONNECTOR CONCEPTS

(75) Inventors: Jeffrey D. Nielson, Wylie, TX (US);
Timothy W. Anderson, Omaha, NE (US); Matthew Cruz, Council Buffs, IA (US)

(73) Assignee: Commscope, Inc. of North Carolina, Hickory, NC (US)

( * ) Notice: Subject to any disclaimer, the term of this patent is extended or adjusted under 35 U.S.C. 154(b) by 0 days.

(21) Appl. No.: 11/765,318

(22) Filed: Jun. 19, 2007

(65) Prior Publication Data

US 2007/0292083 A1 Dec. 20, 2007

Related U.S. Application Data

(60) Provisional application No. 60/814,527, filed on Jun. 19, 2006.

(51) Int. Cl.
*G02B 6/36* (2006.01)
(52) U.S. Cl. .............................. 385/78; 385/33; 385/35; 385/39; 385/50; 385/55; 385/60; 385/61; 385/70; 385/72; 385/73; 385/74; 385/79; 385/85
(58) Field of Classification Search ............ 385/33, 385/35, 39, 50, 55, 60, 61, 70, 72–74, 78–79, 385/85
See application file for complete search history.

(56) References Cited

U.S. PATENT DOCUMENTS

| | | | |
|---|---|---|---|
| 4,461,537 A | 7/1984 | Raymer, II et al. | |
| 6,074,100 A | 6/2000 | Rowland et al. | |
| 6,625,351 B2 * | 9/2003 | Cox et al. | 385/33 |
| 7,031,567 B2 | 4/2006 | Grinderslev et al. | |
| 2002/0009261 A1 * | 1/2002 | Bhagavatula et al. | 385/35 |
| 2005/0036735 A1 | 2/2005 | Oosterhuis et al. | |

FOREIGN PATENT DOCUMENTS

| | | |
|---|---|---|
| GB | 2 145 534 A | 3/1985 |
| GB | 2 428 490 A | 1/2007 |
| WO | WO 2007/009676 A1 | 1/2007 |

\* cited by examiner

*Primary Examiner*—Frank G Font
*Assistant Examiner*—Michael P Mooney
(74) *Attorney, Agent, or Firm*—Muncy, Geissler, Olds & Lowe, PLLC (57) ABSTRACT

A terminus for a fiber optic cable includes a ferrule. An optic fiber of the cable passes through a central bore of the ferrule and is attached to a lens seated in a conical or cylindrical seat formed in an end surface of the ferrule by an epoxy. Preferably, the seat permits the lens to be recessed below the end surface of the ferrule. An inspection slot may be formed through the seat to allow a technician to inspect the state of the epoxy attachment. The ferrule may also include retaining features, such as an o-ring encircling a groove in the outer circumference of the ferrule or a metal sleeve crimped or otherwise attached to the ferrule to permit the ferrule to be easily attached to a cable retention sleeve, connector body or similar structure.

26 Claims, 9 Drawing Sheets

EXPANDED BEAM CONNECTOR CONCEPTS

This application claims the benefit of U.S. Provisional Application No. 60/814,527, filed Jun. 19, 2006, the entire contents of which are herein incorporated by reference.

BACKGROUND OF THE INVENTION

1. Field of the Invention

The present invention relates to fiber optic communications. More particularly, the present invention relates to a terminus to provide an orderly termination of a fiber optic cable, and to structures incorporating one or more of the termini, such as a connector, jumper, or attenuator.

2. Description of the Related Art

It is known in the background art, that a fiber optic cable may be cut and terminated for connection to a connector, jumper or attenuator, or other such structure. A typical termination includes a ferrule having a central bore passing through a center thereof. A length of optical fiber is exposed at the end of the cut fiber optic cable. The optical fiber is passed through the central bore in the ferrule and cut flush with the end of the ferrule. An epoxy secures the optical fiber within the central bore, and the cut end of the optical fiber is polished, along with the end of the ferrule, to finish the termination.

There was an appreciation in the background art that such a typical termination was unsuitable for use in harsh environments which are prone to vibration, such as in an aircraft. Since the optical fiber extended to the end of the ferrule and made physical contact with a receiving structure, the optical fiber was susceptible to damage (e.g. small stress cracks) when vibrated. U.S. Pat. No. 6,074,100, which is herein incorporated by reference, addressed this physical contact drawback associated with the typical termination.

Figure 9:
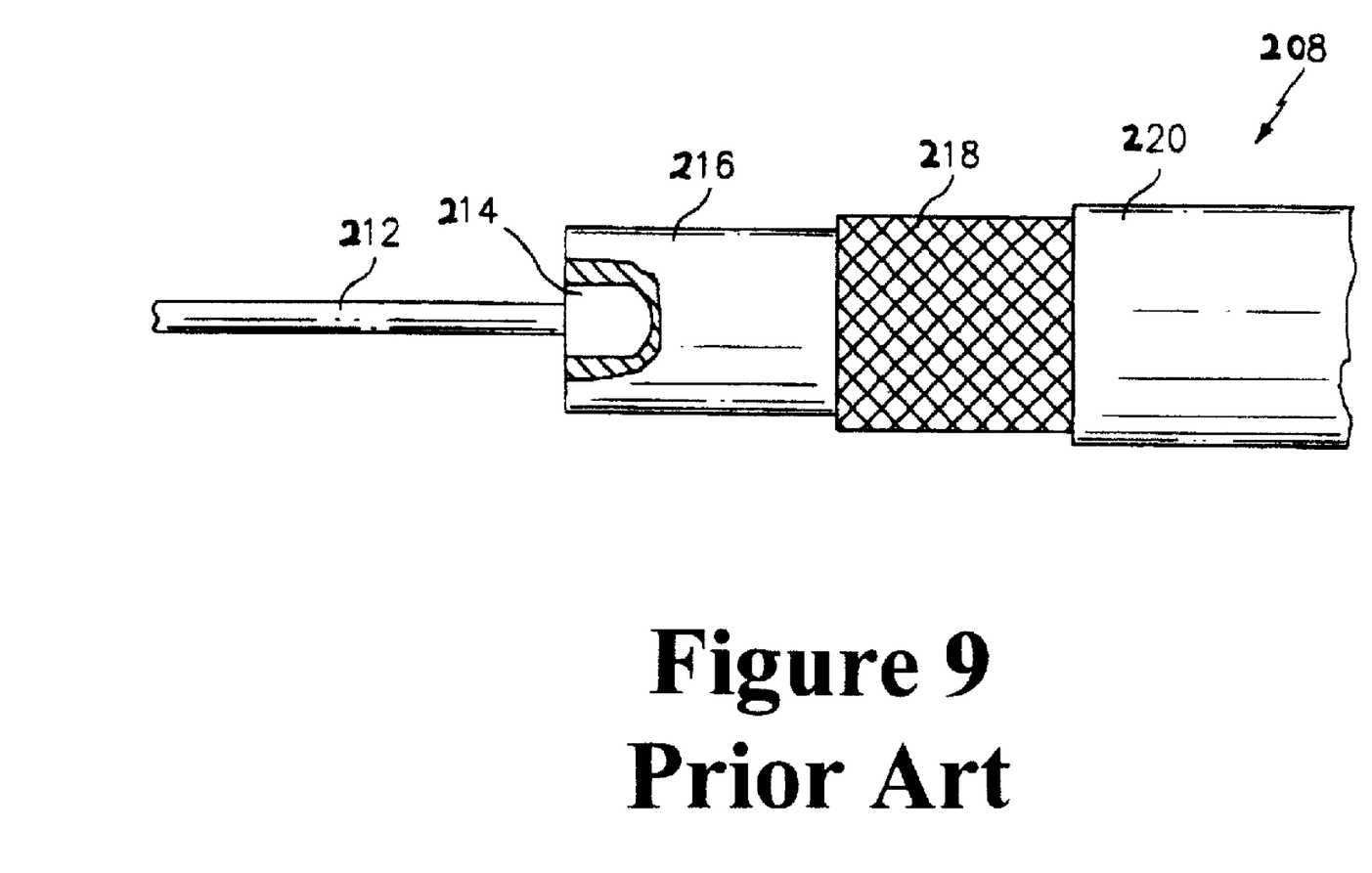
FIG. 9 is a side view, partially in cross section, illustrating an end of a fiber optic cable which has been stripped to reveal an optical fiber, in accordance with the prior art.

FIGS. 9-13 illustrate the terminus of U.S. Pat. No. 6,074,100. In FIG. 9, the fiber optic cable 208 is stripped to remove and expose several sheaths of cable material. The stripped end of the fiber optic cable 208 includes a central optical fiber 212, a silicon buffer 214 disposed about the optical fiber 212, an inner jacket 216 enveloping the silicon buffer 214, a strengthening member 218 comprising a braided or woven fiber, e.g., a polyamide fiber such as Kevlarb®, wrapped about the inner jacket 216, and an outer jacket 220 enveloping the strengthening member 218.

Figure 10:
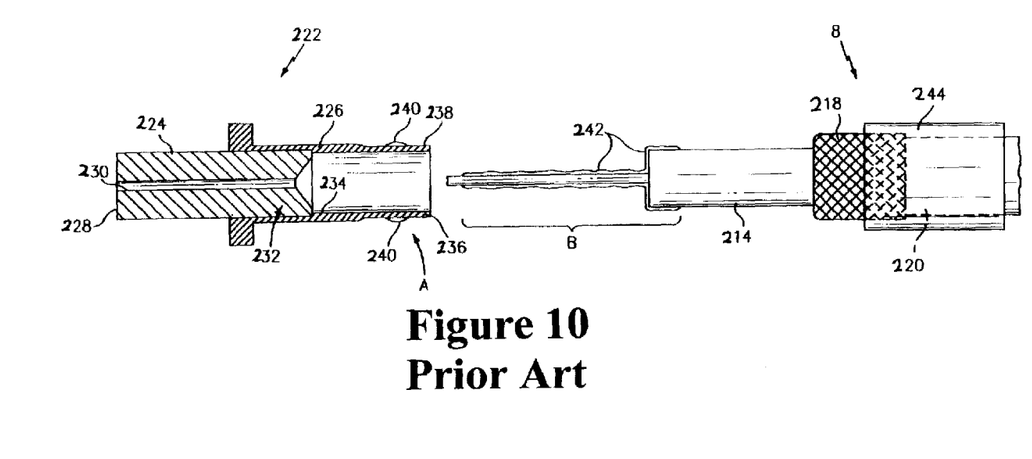
FIG. 10 is a side view, partially in cross section, illustrating the stripped end of FIG. 9 prepared for bonding to a ferrule assembly, in accordance with the prior art.

In FIG. 10, the stripped end of the fiber optic cable 208 is prepared for bonding to a ferrule assembly 222. The ferrule assembly 222 includes a rigid ferrule 224 and an aft body or sleeve 226 circumscribing and bonded to an end portion of the ferrule 224. More specifically, the rigid ferrule 224 defines an external face surface 228, a central bore 230 and an internal end 232, and the aft body 226 comprises a cylindrical inner bore 234 and a tapered end 236 defining a cylindrical outer surface 238. The ferrule 224 is fabricated from a ceramic, such as zirconia, and the aft body 226 is fabricated from stainless steel.

In preparation for bonding, a bead or ring of bonding adhesive 240 is applied to the outer surface 238 of the aft body 226, corresponding to region A, and a layer of bonding adhesive 242, corresponding to region B, is applied to the optical fiber 212 and inner jacket 214. The bonding adhesives 240, 242 in regions A and B are the same and, furthermore, are selected such that the Glass Transition Temperature ($T_G$) is greater than the maximum temperature anticipated in the operating environment of the terminus. Prior to bonding, the strengthening members 218 are folded rearwardly over the outer jacket 220. A shrink tubing 244, which will subsequently overlay the strengthening member 218, is used to temporarily preposition the strengthening member 218 over the outer jacket 220.

Figure 11:
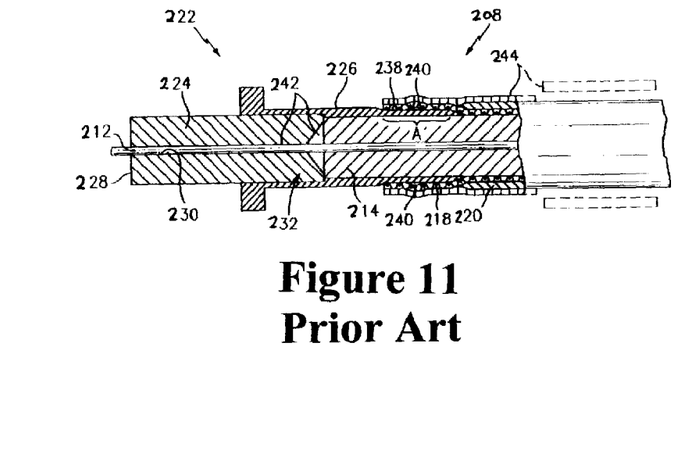
FIG. 11 illustrates the bonding of the stripped end to the ferrule assembly to form a terminus, in accordance with the prior art.

In FIG. 11, the stripped end of the fiber optic cable 208 is inserted within the ferrule assembly 222 such that the optical fiber 212 passes through the ferrule bore 230 and the inner jacket 214 abuts the internal end 232 of the ferrule 224. Next, the shrink tubing 244 is slid rearwardly (shown in phantom) to release the strengthening member 218 which is then folded over the cylindrical outer surface 238 of the aft body 226. As such, the ring of bonding adhesive 240 in region A contacts and impregnates the strengthening member 218. The shrink tubing 244 is then moved forwardly such that it overlays the strengthening member 218 and the outer jacket 220. During a curing process, the adhesive 240 is solidified and the shrink tube 244 contracts. After the curing process, the end of the optical fiber 212 is cleaved in close proximity to the external face surface 228 of the ferrule 224, as illustrated in FIG. 11.

Figure 12:
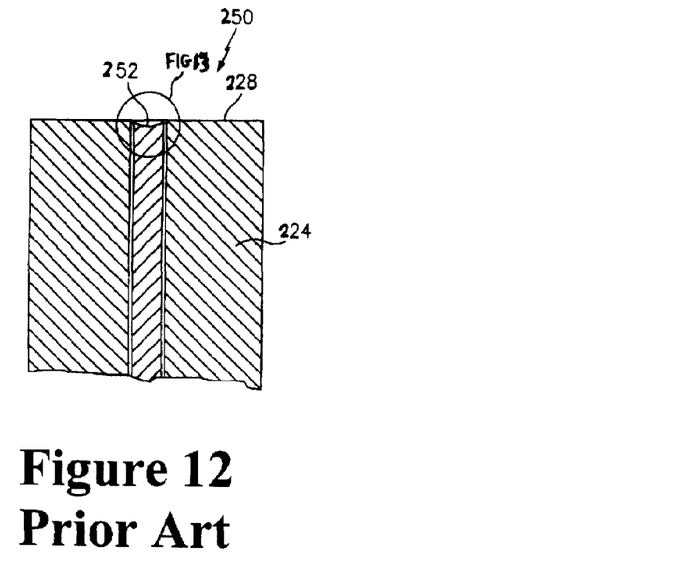
FIG. 12 is a cross sectional side view of the end of the terminus of FIG. 11 subsequent to a polishing operation.
Figure 13:
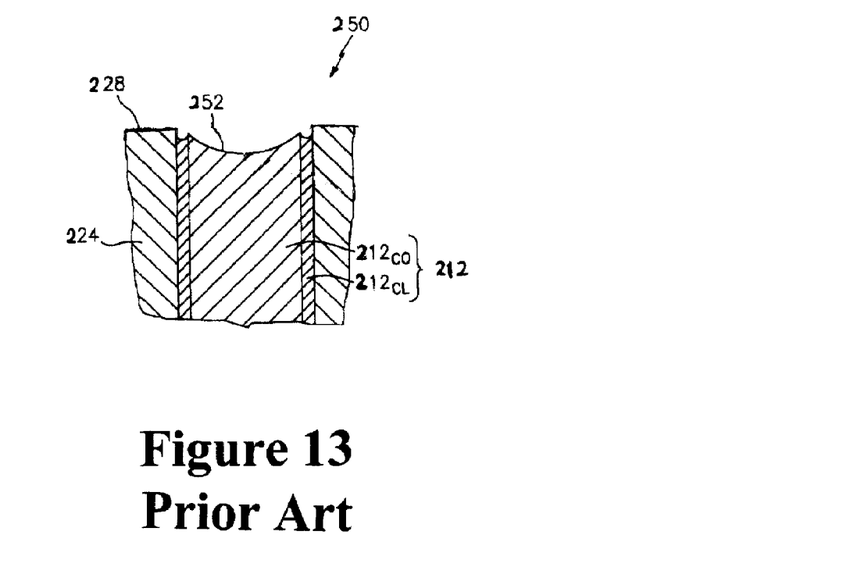
FIG. 13 is a cross sectional close-up view of the optical fiber at the end of the terminus of FIG. 12.

Then, various sanding or polishing operations are preformed in order to recess the cut end of the optical fiber 212 below the external face surface 228 of the ferrule 224, as illustrated in FIGS. 12 and 13. Specifically, the end profile 250 is characterized by the optical fiber 212 defining an end surface 252 which is recessed or undercut relative to the face surface 228 of the ferrule 224 (as best shown in FIG. 12). The end surface of the optical fiber 212 is at least the combination of the light-carrying core $212_{CO}$ and its surrounding cladding $212_{CL}$.

By the arrangement of FIGS. 9-13, U.S. Pat. No. 6,074,100 provides a fiber optic cable termination more suitable for use in a demanding operational environment prone to vibration. By recessing the optical fiber termination 252 to a point within the ferrule end 228, the optical fiber was no longer in direct physical contact with a light transmission/reception structure (e.g., another optical fiber end pr detector lens) and hence was less susceptible to damage (e.g., cracks in the optical fiber).

SUMMARY OF THE INVENTION

The Applicants have appreciated drawbacks in the terminus of the prior art.

With a physical contact (PC) connector, if a technician unintentionally snags the cordage entering the PC connector while working with tools, the ferrule holding the optical fiber can slightly retract into the connector body against a spring bias. If the ferrule retracts more than ½ of a wavelength of the signal, the signal connection will be lost. In ships, airplanes, submarines, etc., loss of the signal can be a trigger to reset computer equipment or to proceed to an emergency program. Either circumstance can be dangerous.

Also with prior art PC connectors, the connection is highly susceptible to dirt and dust. The presence of dirt and/or dust in the vicinity of the optical fiber of the ferrule can cause the connector to fail.

Applicants have also appreciated that having several different terminus structures for different type end structures (e.g., connectors, jumpers, attenuators) is inefficient. Such arrangements of the background art require designing, tooling and inventorying many different parts. Moreover, technicians must be trained to install several different types of terminus and must carry different types of specialty tools for differently structured termini.

Also, Applicants have appreciated that many of the termini of the background art are difficult to install at the end of the fiber optic cable, insecure in their attachment to the end of the cable, and insecure in their attachment to the end structure (e.g., connector, jumper) and exhibit variable performance characteristics (e.g., dB losses at the terminus are widely inconsistent as installed and can change with vibration of the terminus).

The present invention addresses one or more of the drawbacks of the prior art.

These and other objects are accomplished by a terminus for a fiber optic cable including a ferrule. An optic fiber of the cable passes through a central bore of the ferrule and is attached to a lens seated in a conical or cylindrical seat formed in an end surface of the ferrule by an epoxy. Preferably, the seat permits the lens to be recessed below the end surface of the ferrule. An inspection slot may be formed through the seat to allow a technician to inspect the state of the epoxy attachment. The ferrule may also include retaining features, such as an o-ring encircling a groove in the outer circumference of the ferrule or a metal sleeve crimped or otherwise attached to the ferrule to permit the ferrule to be easily attached to a connector body, fiber optic cable or similar structure.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limits of the present invention, and wherein.

DETAILED DESCRIPTION OF EMBODIMENTS OF THE INVENTION

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

Figure 1:
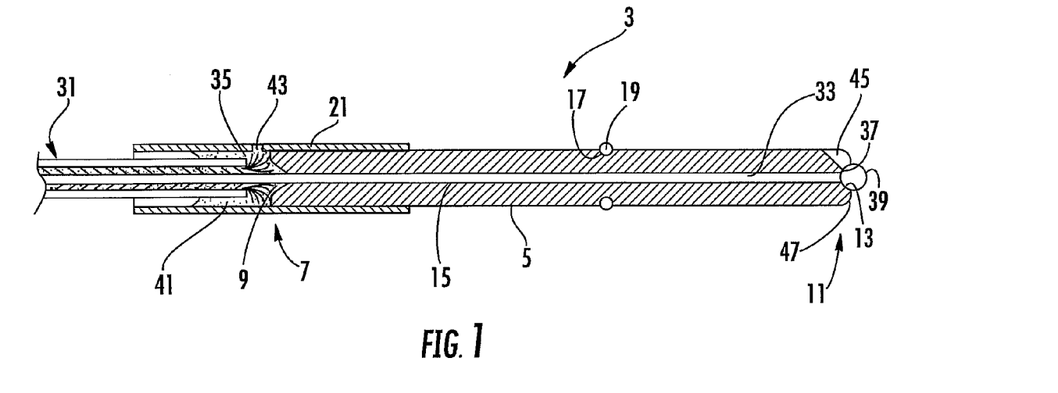
FIG. 1 is a cross sectional side view of a terminus in accordance with the present invention.

FIG. 1 is a cross sectional side view of a terminus 3 in accordance with the present invention. The terminus 3 includes a ferrule 5. The ferrule 5 is generally cylindrical in shape, made of ceramic (e.g., zirconia), and has an outside diameter of 1.25 mm. Of course, other shapes, sizes and materials may be selected for the ferrule 5.

A first end 7 of the ferrule 5 includes a first conical entrance 9. A second end 11 of the ferrule 5 includes a second conical entrance 13. Although a conical shape is illustrated, the shape could be cylindrical or any other type of shape resulting from a counter bore within the second end 11 of the ferrule 5. The first and second conical entrances 9 and 13 are generally centered in the first and second ends 7 and 11, respectively.

A bore 15 passes through the center of the ferrule 5 from a center of the first conical entrance 9 to a center of the second conical entrance 13.

A retaining feature, such as a narrow ring or trench 17 may be cut into an outer surface of the ferrule 5 to encircle the outer surface of the ferrule 5. A retainer ring 19 removably resides within the trench 17. The retainer ring 19 may be formed of metal, a polymer or a composite. In preferred embodiments, the retainer ring 19 is a spring clip or a rubber O-ring. The retainer ring 19 plays a role in attaching the terminus 3 to other structures (e.g. a connector, a jumper), and may be located at other locations on the ferrule 5. An alternative, differently structured retaining feature is described in relation to FIG. 5B below.

Figure 2:
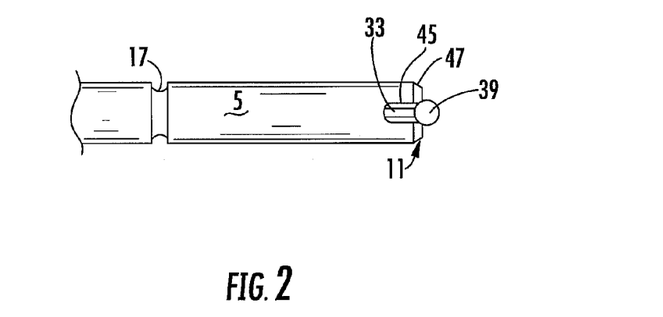
FIG. 2 is a top view illustrating an end portion of the ferrule of FIG. 1.
Figure 3:
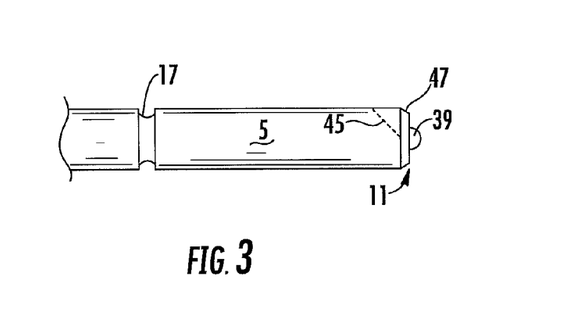
FIG. 3 is a side view, illustrating the end portion of the ferrule of FIG. 1.
Figure 4:
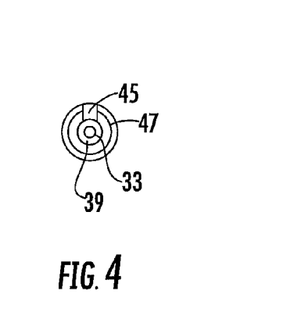
FIG. 4 is an end view of the ferrule of FIG. 1.

The second end 13 of the ferrule 5 includes an inspection slot 45 and a chamfer 47, as best seen in FIGS. 2-4. The inspection slot 45 is a cutout in the material of the ferrule 5, which passes down to the bore 15. The inspection slot 45 may be formed with a diamond saw blade or by other means. The function of the inspection slot 45 will be described below.

The terminus 3 also includes a sleeve 21. The sleeve 21 is generally cylindrical in shape, made of metal (such as stainless steel), and has an inner diameter approximately equal to or slightly greater than 1.25 mm (i.e. slightly greater than the outer diameter of the ferrule 5). Of course, the sleeve 21 could be made of other materials, such as ceramic, polymer or composite materials. Also, the sleeve 21 could be differently shaped and sized, so long as the ferrule 5 could be registered into the sleeve 21, as illustrated in FIG. 1.

Now, a use of the terminus 3 in conjunction with a fiber optic cable or cordage 31 will be described. First, the cordage 31 is passed through the sleeve 21. Next, an outer layer of the cordage 31 is removed to expose a long section of the light carrying fiber 33 (approximately as long as the ferrule 5) and a short section of the cable strength member, e.g., KEVLAR fibers 35, which surround the light carrying fiber 33 (as depicted in FIG. 9).

The light carrying optical fiber 33 is inserted into the bore 15 at the first end 7 of the ferrule 5 using the first conical entrance 9 as a guide. The optical fiber 33 is passed through the bore 15 to the second end 11 of the ferrule 5 and stops at the second conical entrance 13.

An epoxy 37 is applied to the end of the optical fiber 33 and inside the second conical entrance 13. A lens 39 is seated into the second conical entrance 13, such that the epoxy 37 adheres the lens 39 to the optical fiber 33 and the second conical entrance 13. In a preferred embodiment, the lens 39 is a spherical lens with a diameter of 200 to 500 um (e.g., 300 um), is formed of sapphire, and has an antireflective coating. However, other types and sizes of lens may be employed. The epoxy 37 preferably has optical characteristics matching or close to the optical characteristics of the optical fiber 33 and/or lens 39. The epoxy 37 may have an index of refraction value (e.g. 1.57) which is between the index of refraction value (e.g. 1.46 to 1.49) of the optical fiber 33 and the index of refraction value (e.g. 1.7) of the lens 39. For example, the epoxy 37 could have an index of refraction value between about 1.4 and 1.8.

The sleeve 21 is slid over the cordage 31 to cover the junction between the cordage 31 and the ferrule 5. Additional epoxy or another type of adhesive 41 is inserted into the junction area where the cordage 31 meets the ferrule 5. The adhesive 41 is illustrated with dots in FIG. 1 and need not have any particular optical characteristics. The adhesive 41 may be inserted into this area using a syringe through the end of the sleeve 21, which does not possess the ferrule 5. Alternatively, the syringe may be inserted through a hole 43 in a sidewall of the sleeve 21. The adhesive 41 adheres to the KEVLAR fibers 35, the end of the cordage 31, the sleeve 21, the optical fiber 33, and/or the first end 7 of the ferrule 5. HYSOL 151 adhesive by Locktite works well.

Lastly, the technician may use a scope to peer through the inspection slot 45 to view the status of the epoxy 37 and the connection of the lens 39 to the optical fiber 33 and the second end 11 of the ferrule 5. The technician may add epoxy 37 and/or position the end of the optical fiber 33 a preferred distance from lens 39 while viewing the gap through inspection slot 45

FIG. 2 is a top view illustrating approximately one half of the ferrule 5 adjacent to the second end 11. FIG. 3 is a side view, similar to FIG. 1 but not in cross section, illustrating approximately one half of the ferrule 5 adjacent to the second end 11. FIG. 4 is an end view of the second end 11 of the ferrule 5.

Figure 5:
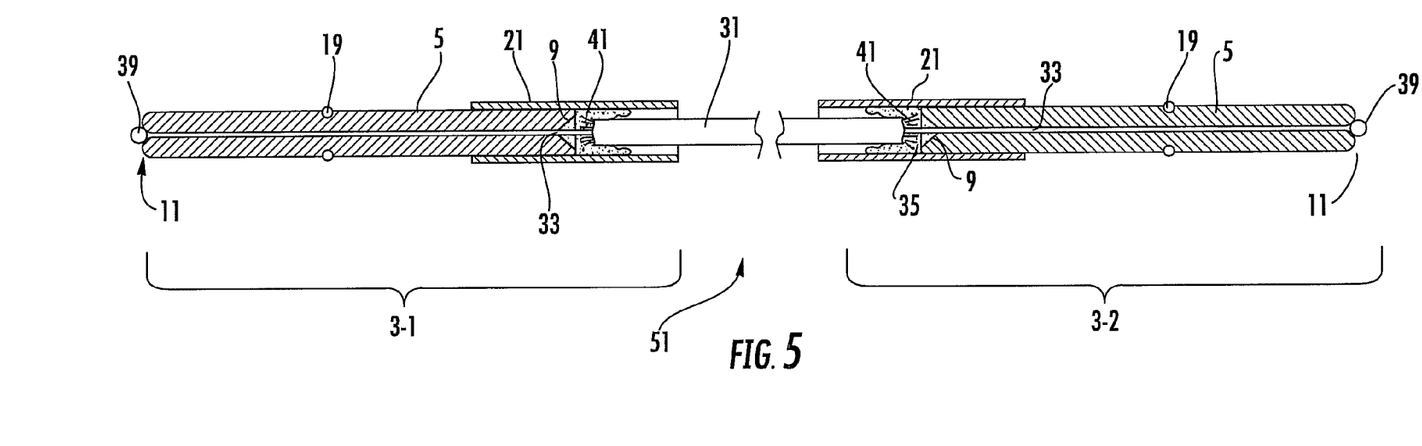
FIG. 5 is a cross sectional view illustrating a jumper formed by a length of fiber optic cable with ferrules, as depicted in FIG. 1, attached at each end.

FIG. 5 demonstrates how a first terminus 3-1 may be connected to an identically constructed second terminus 3-2 to configure a jumper 51. As can be seen in FIG. 5, a select length of cordage 31 may be cut, e.g. 3 inches, 6 inches, 30 cm, 500 meters. The first terminus 3-1 is attached to one end of the cordage 31 and the second terminus 3-2 is attached to the other end of the cordage 31. In FIG. 5, the first terminus 3-1 and the second terminus 3-2 are illustrated in cross section, whereas the cordage 31 is illustrated in a side view, without cross section, to simplify the drawing.

The jumper 51 can be used to independently replace channels of a multi-channel connector, as will be described hereinafter. In so doing, the jumper 51 can minimize repair costs.

Figure 5A:
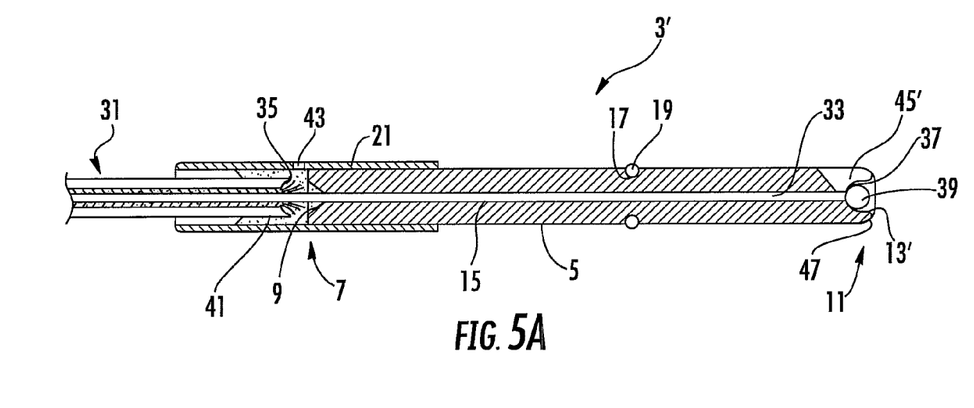
FIG. 5A is a cross sectional view similar to FIG. 1, but illustrating an alternative design for the terminus.

FIG. 5A is a cross sectional view similar to FIG. 1, but illustrating an alternative design for the terminus 3. In FIG. 5A, the alternative terminus 3' includes many identical parts as compared to the terminus 3, and such identical parts are identified by the same reference numerals. The primary distinction of alternative terminus 3' is that the second conical entrance 13' extends further into the ferrule 5, such that the lens 39 is recessed into the second end 11 of the ferrule 5. Also, the inspection slot 45' has been extended further back into the ferrule 5.

Figure 5B:
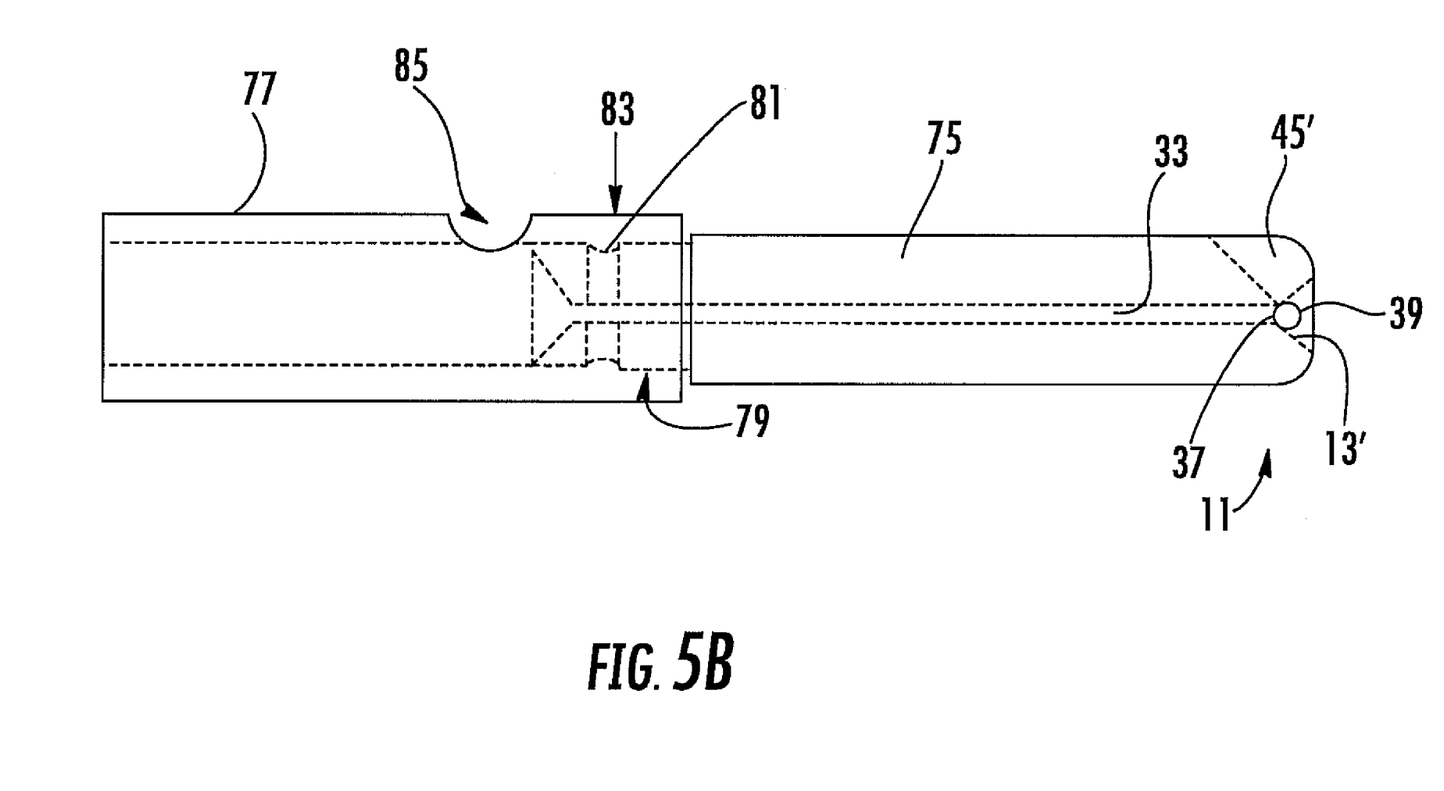
FIG. 5B is a side view similar to FIG. 3, but illustrating yet another alternative design for a terminus with alternative retaining features.

In an alternative embodiment depicted in FIG. 5B, retaining features 17 and 19 have been replaced by a dual purpose sleeve 77. The sleeve 77 serves the same purpose as the sleeve 21 in FIG. 5A and also serves the purposes of a retaining feature. The ferrule 75 has a reduced diameter portion 79 to receive the sleeve 77. The reduced diameter portion 79 includes a perimeter groove 81. The sleeve 77 may be attached to the ferrule 75 by applying a series of crimps, or a continuous crimp, along a perimeter of the sleeve 77 generally located beneath arrow 83. The sleeve 77 may also be attached to the ferrule 75 by epoxy and/or by pressing the two members together, wherein a frictional attachment occurs due to the size of the inner diameter of the sleeve 77 being approximately the same as the outer diameter of the reduced diameter portion 79 of the ferrule 75, e.g., an interference fit. Further, the sleeve 77 could include a protruding or recessed feature on its outer surface (such as the cutout 85). The cutout 85 would allow a technician to insert or inspect epoxy at the rear of the ferrule 75, if desired. The cutout 85 could also be engaged by other fixing devices of secondary structures. For example, a crimp in a secondary structure could protrude into the cutout 85 to fix the terminus of FIG. 5B to the secondary structure.

Figure 6:
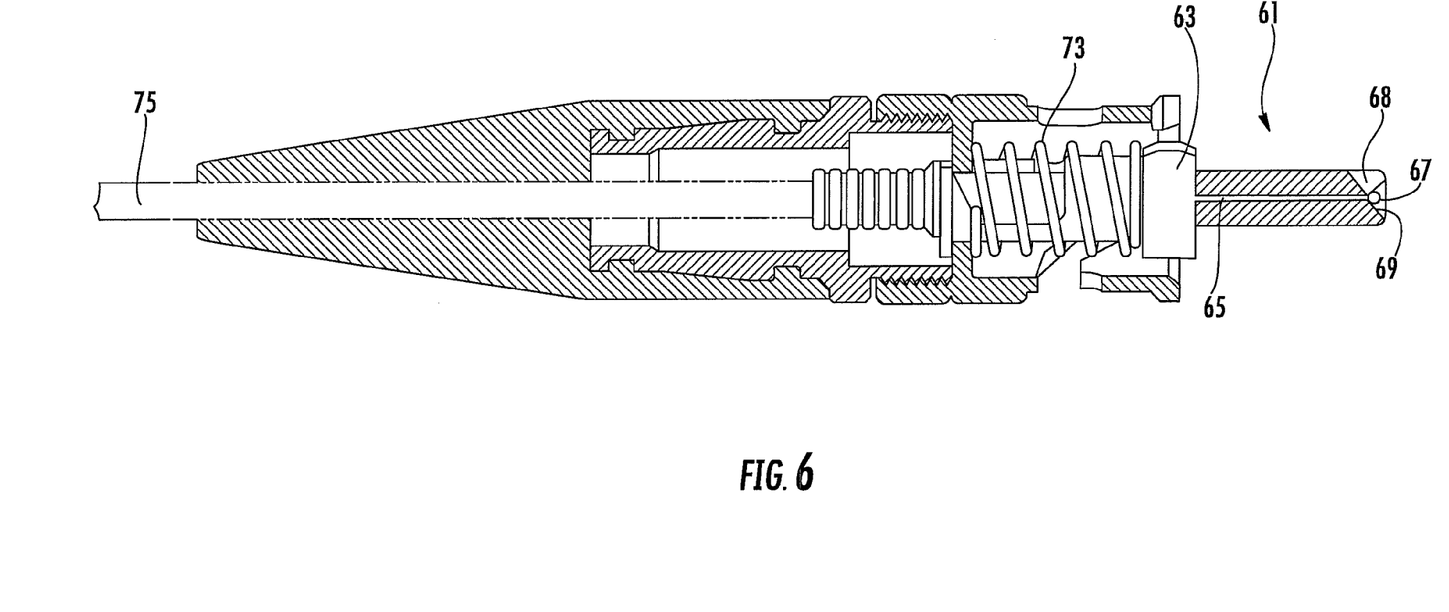
FIG. 6 is a cross sectional side view of an ST fiber optic connector including a terminus in accordance with FIG. 5A.

The recessed nature of the lenses 39 in FIGS. 5A and 5B will protect the lens 39 in physical contact (PC) type connectors, and will essentially convert a PC type connector into an expanded beam connector as will be seen in relation in FIG. 6. In a PC-type connector, the light carrying optical fiber passes through and completely to the end of the ferrule or other holding structure. The end of the ferrule is in physical contact with another ferrule (or structure for transmitting/receiving light) having a polished end with an optic fiber terminating in its end. The Applicants have appreciated drawbacks in the PC connectors of the background art.

The PC connector is very susceptible to communication errors in harsh environments. Since the diameter of the light transmission path between the ferrules of mating connectors is very small, any dust or debris in this location will severely attenuate the signal strength. Also, the aspect of physical contact is very troublesome when vibrations are present. The vibration leads to wear, scratches and damage to the optic fiber ends. The wear changes the performance characteristics of the connector over time. Further, the wear can lead to misalignments in the connector and signal transmission failure.

U.S. Pat. No. 6,074,100 discussed in the background art section herein addressed one of these drawbacks by recessing the optical fiber end back from the end surface of the ferrule. However, the present invention also converts the connector into an expanded beam connector by virtue of the lens 39, which even further improves the performance of a PC connector in a harsh environment, as will be detailed hereinafter. To this end, the present invention provides expanded beam connectors with physical dimensions and feature locations (i.e. the envelope of the connector) to replace standardized PC connectors.

FIG. 6 illustrates a standard ST type connector envelope with the expanded beam features of the present invention. Specifically, the physical contact ferrule assembly of the background art has been removed. In its place, Applicants have inserted an expanded beam ferrule assembly 61 (which may be constructed the same as, or similar to, the ferrule 3' of FIG. 5A or ferrule 75 FIG. 5B). The expanded beam ferrule assembly 61 may include the retainer ring 19, as illustrated in FIG. 5A in order to attach the ferrule assembly 61 to a collar 63 of the ST connector. Alternatively, the collar 63 may be press fit onto the stainless steel sleeve 77 of the ferrule assembly of FIG. 5B, or adhered thereto by epoxy, or by any other fixing manner. Alternatively, the expanded beam ferrules 5 or 75 may be pressed, or attached by an epoxy, directly into the collar 63, without any need for retaining features 17 and 19 and/or any need for a sleeve 21 or 77.

As seen in FIG. 6, the ferrule assembly 61 has a central bore through which a light carrying optical fiber 65 passes. A lens 67 is positioned within a conical recess 69 in the face of the ferrule assembly 61. An index matching epoxy fixes the lens 67 to the optical fiber 65 and the conical recess 69. The connections between the optical fiber 65, conical recess 69 and lens 67 may be inspected via the inspection slot 68.

As can be seen in FIG. 6, the lens 67 is recessed into the ferrule assembly 61, via the conical recess 69, by a distance greater than the diameter of the lens 67. Therefore, the lens 67 is protected in the end of the ferrule assembly 61, i.e. a planar object in contact with the end of the ferrule assembly 61 will not come into physical contact with the lens 67.

Applicants have discovered that the expanded beam ST connector has many advantages over the PC ST connector. The lens 67 widens the light path to about three times the diameter of the optical fiber 65. This is particularly advantage in high vibration environments, which generate dust and debris. For example, with the connector of U.S. Pat. No. 6,074,100 physical contact exists between the ferrule and the transmitting/receiving structure. If vibration causes wear on the interface, the wear can generate dust within the connector. If a piece of dust or dirt having a cross sectional area equal to half the end surface area of the optic fiber 65 were to be in the center of a PC ferrule of the background art, that piece of dirt would block about 50% of the light passing through the connector. Most likely, the PC ST connector would fail under that circumstance. If that same sized piece of dirt were to be in the center of the expanded beam ferrule assembly 61 of the present invention, it would block about 11% of the light passing through the connector. Most likely the expanded beam ST connector would continue to function.

Also, in the PC ST connector of the background art, direct physical contact of the optical fiber at the end of the ferrule is troublesome. Vibration in the connector leads to wear, scratches and damage to the optical fiber end. The wear changes the performance characteristics of the connector over time. The expanded beam ST connector of the present invention does not suffer this drawback. The lens 67 does not come into direct contact with another object. Rather, there is an optimum spacing for the lens 67 from a detector lens or optical fiber. The optimum spacing is preferably 15 to $^{40}/_{1000}$ of an inch to achieve minimum signal attenuation. However, this spacing will vary depending upon the material, coatings, size and shape of the lens 67. Having the light transmitting and receiving features separated by a gap insulates them from wear concerns and helps to keep the performance characteristics of the expanded beam ST connector constant over time.

Also, the expanded beam ST connector is less susceptible to unintentional disconnects. In the PC ST connector, if a technician unintentionally snags the cordage 75 entering the PC ST connector while working with tools, or a shock wave strikes the connector or device, the PC ferrule can slightly retract into the connector envelope against the bias of the spring 73 encircling the collar 63. If the PC ferrule retracts more than ½ of a wavelength of the signal, the signal connection will be lost. In ships, airplanes, submarines, etc., loss of the signal can be a trigger to reset computer equipment or to proceed to an emergency program. Either circumstance can be dangerous.

In the expanded beam ST connector of the present invention, physical contact along the light path in the connector is not required. Rather, a gap is purposefully present. Moreover, due to the lens 67 the gap may be expanded greatly without loosing the signal connection through the connector. For example, if the cordage of the expanded beam ST connector is snagged by a technician the expanded beam ferrule assembly 61 could be retracted approximately 1,000 times further into the collar 63, as compared to the PC ferrule of the PC ST connector, without disconnecting the signal connection, assuming the collar 63 would even permit such a retraction length.

Figure 7:
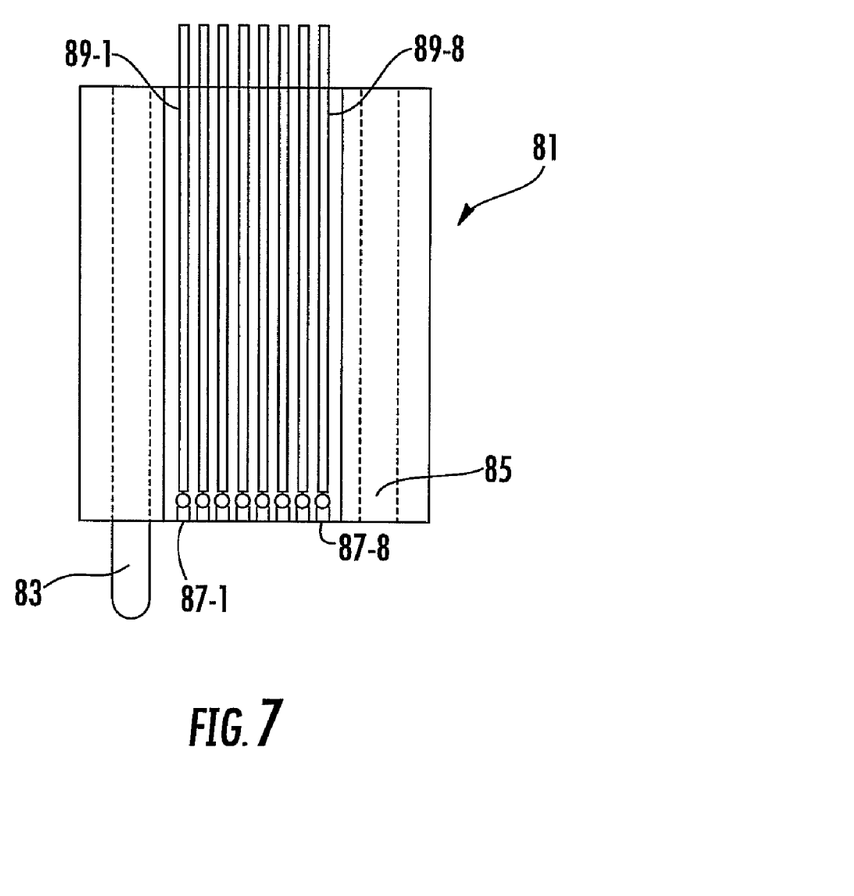
FIG. 7 is a top view of a first embodiment of an MT connector including a plurality of termini in accordance with the present invention.
Figure 7A:
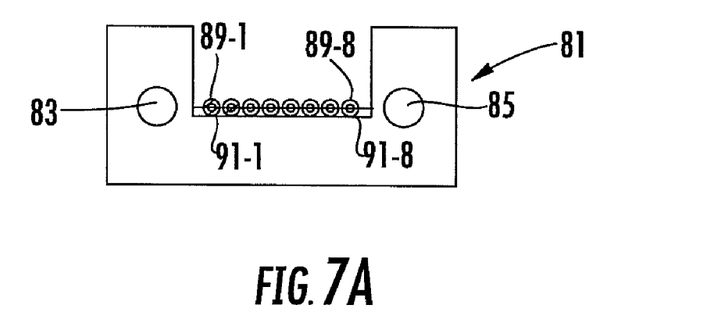
FIG. 7A is an end view of the MT connector of FIG. 7.

FIG. 7 includes a top view and an end view of an expanded beam MT type connector, in accordance with the present invention. The MT type connector is generally block shaped and typically has dimensions on the order of 3/8"×1/8"×3/8". The MT physical contact (PC) connector of the background art has two to twelve channels, such as eight channels. If one channel breaks or is damaged, the entire MT PC connector of the background art is replaced. Applicants appreciated that this was wasteful.

Therefore, Applicants have devised an expanded beam MT connector which has all of the advantages mention above in connection with expanded beam ferrules over PC ferrules. FIG. 7 is a top view of the expanded beam MT connector 81, whereas FIG. 7A is a connector end view of the expanded beam MT connector 81.

The expanded beam MT connector can have individual channels repaired by a technician. For instance, an optic fiber extending from the fiber optic cable to a defective channel within the MT connector 81 could be cut and a new terminus installed onto the cut optical fiber on the fiber optic cable side. The defective terminus within the MT connector 81 could be removed and if sufficient fiber optic cable length were present, the newly installed terminus could be plugged into the vacated position in the MT connector 81 where the defective terminus was removed. If insufficient fiber optic cable length exists, the repair could be facilitated using a jumper 51, as illustrated in FIG. 5.

As can be seen in FIG. 7, the expanded beam MT connector 81 has an alignment pin 83 and an alignment hole 85. A top of the MT connector 81 is open to exposed eight v-grooves 87-1 through 87-8. Eight termini 89-1 through 89-8 reside in the eight v-grooves 87-1 through 87-8. As best seen in FIG. 7A, the eight termini 89-1 through 89-8 present eight lenses 91-1 through 91-8 at a connection end of the MT connector 81. The lenses 91-1 through 91-8 are slightly recessed into the connection end of the MT connector 81 to protect the lenses 91-1 through 91-8 from wear.

Figure 8:
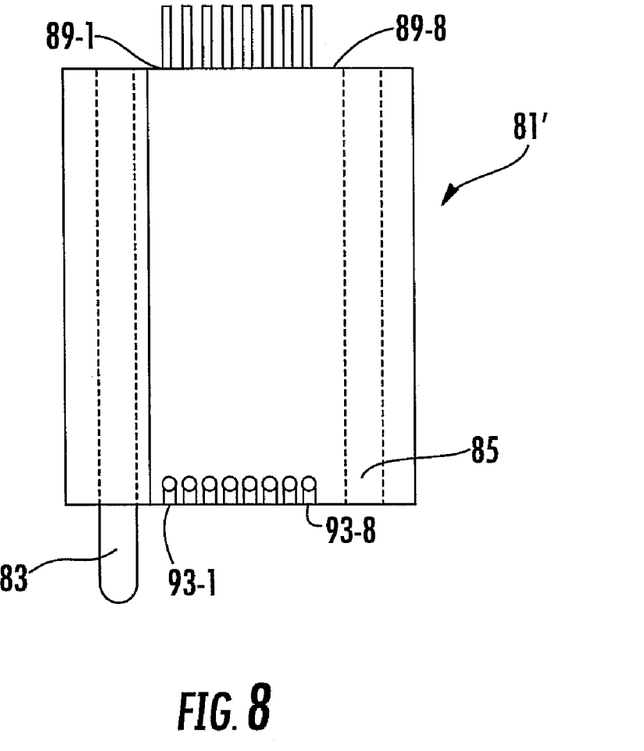
FIG. 8 is a top view of a second embodiment of an MT connector including a plurality of termini in accordance with the present invention.
Figure 8A:
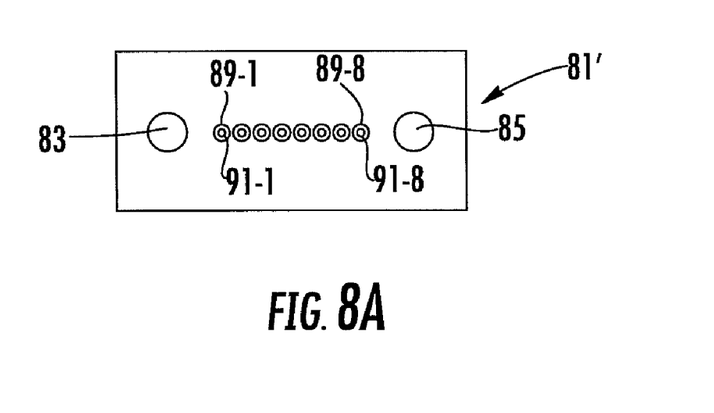
FIG. 8A is an end view of the MT connector of FIG. 8.

FIG. 8 is a top view of an alternative expanded beam MT type connector 81', in accordance with the present invention. FIG. 8A is a connector end view of the alternative expanded beam MT connector 81'. The alternative expanded beam MT type connector 81' does not have an open top, but rather includes bores 93-1 through 93-8. The termini 89-1 through 89-8 are located in the bores 93-1 through 93-8. The lenses 91-1 through 91-8 are slightly recessed into the connection end of the alternative MT connector 81' to protect the lenses 91-1 through 91-8 from wear.

Although FIGS. 7, 7A, 8 and 8A illustrated termini 89-1 through 89-8, it should be appreciated that several advantages of the present invention could also be obtained by simply fixing the cordage or optical fiber directly in the v-grooves 87-1 through 87-8 or in the bores 93-1 through 93-8. The cordage or optical fibers could be fixed by an epoxy. Such a modification would still have the recessed lenses 91-1 through 91-8 and would still enjoy the benefits of the improved immunity to dust and debris and the improved protection from wear; however the ability to replace an individual channel would be impaired.

Although FIGS. 6, 7, 7A, 8 and 8A have illustrated ST and MT type connector envelopes, it should be appreciated that the expanded beam ferrules of the present invention could be applied to other types of connector envelopes, such as LC, SC, FC, MU, ROC, 38999 or 29504 type connector envelopes.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

We claim:

1. A fiber optic cable apparatus comprising:
   a ferrule having a bore passing from a first end to a second end;
   an optical fiber passing through said bore; and
   a lens attached to said second end of said ferrule and attached to said optical fiber, wherein said second end includes a recessed seat, and wherein said lens resides in said recessed seat, and wherein said lens has a size which is less than a depth of said recessed seat, such that said lens does not protrude past a plane of said second end of said ferrule, wherein said lens is distanced from an end of said optical fiber and the attachment between said lens and said optical fiber is made by an epoxy having optical characteristics.

2. A fiber optic cable apparatus comprising:
   a ferrule having a bore passing from a first end to a second end;
   an optical fiber passing through said bore;
   a lens attached to said second end of said ferrule and attached to said optical fiber; and
   an inspection slot formed in said ferrule proximate said second end which affords a view of the attachment between said lens and said optical fiber.

3. The fiber optic cable apparatus of claim 1, wherein said recessed seat is substantially conical or cylindrical in shape.

4. A fiber optic cable apparatus comprising:
   a ferrule having a bore passing from a first end to a second end;
   an optical fiber passing through said bore;
   a lens attached to said second end of said ferrule and attached to said optical fiber, wherein said second end includes a recessed seat, and wherein said lens resides in said recessed seat, and wherein said lens has a size which is less than a depth of said recessed seat, such that said lens does not protrude past a plane of said second end of said ferrule; and
   an inspection slot formed in said ferrule proximate said second end which affords a view of the attachment between said lens and said optical fiber.

5. The fiber optic cable apparatus of claim 1, further comprising:
   a connector envelope having ST-connection features supporting said ferrule.

6. A fiber optic cable apparatus comprising:
   a ferrule having a bore passing from a first end to a second end;
   an optical fiber passing through said bore;
   a lens attached to said second end of said ferrule and attached to said optical fiber, wherein said second end includes a recessed seat, and wherein said lens resides in said recessed seat, and wherein said lens has a size which is less than a depth of said recessed seat, such that said lens does not protrude past a plane of said second end of said ferrule; and a connector envelope having MT-connection features supporting said ferrule.

7. The fiber optic cable apparatus of claim 1, further comprising:
a retaining feature formed on an outer circumference of said ferrule for attaching said ferrule to another structure.

8. The fiber optic cable apparatus of claim 7, wherein said retaining feature includes a sleeve attached to said ferrule.

9. The fiber optic cable apparatus of claim 7, wherein said retaining feature includes a groove formed around said outer circumference of said ferrule and at least an o-ring or a spring clip engaged within said groove.

10. The fiber optic cable apparatus of claim 1, wherein has an index of refraction value matching an index of refraction value of one of said optical fiber and said lens, or between an index of refraction value of said optical fiber or said lens.

11. The fiber optic cable apparatus of claim 1, wherein said epoxy has an index of refraction value between about 1.4 and 1.8.

12. The fiber optic cable apparatus of claim 1, wherein said ferrule is generally cylindrical in shape and made of ceramic.

13. The fiber optic cable apparatus of claim 1, wherein said lens is spherical in shape and has a diameter greater than a diameter of said optical fiber.

14. The fiber optic cable apparatus of claim 1, wherein:
said optical fiber extends from a first end of a fiber optic cable to a second end of said fiber optic cable; and
said ferrule is a first ferrule, said bore is a first bore, and said lens is a first lens, and constitute a first terminus attached to said first end of said fiber optic cable, and further comprising:
a second terminus attached to said second end of said fiber optic cable to form a jumper, said second terminus including:
a second ferrule having a second bore passing from a first end to a second end of said second ferrule;
said optical fiber at said second end of said fiber optic cable passing through said second bore; and
a second lens attached to said second end of said second ferrule and attached to said optical fiber.

15. A physical contact (PC) fiber optic connector comprising:
a connector envelope having mounting features sized and shaped to affix the connector envelope to a complimentary structure;
a holder attached to said connector envelope;
a ferrule attached to said holder, said ferrule having a second end sized and shaped to bear against a light receiving and/or light transmitting element of the complimentary structure and said ferrule having a bore passing from a first end to said second end;
an optical fiber passing through said bore; and
a lens attached to said second end of said ferrule and attached to said optical fiber, wherein said second end includes a recessed seat, said lens resides in said recessed seat, and said lens has a size which is less than a depth of said recessed seat, such that said lens does not protrude past a plane of said second end of said ferrule, wherein said lens is distanced from an end of said optical fiber and the attachment between said lens and said optical fiber is made by an epoxy having optical characteristics.

16. The PC fiber optic connector of claim 15, wherein the attachment between said holder and said connector envelope allows for relative movement therebetween, and further comprising:
a spring biasing said holder away from said connector envelope.

17. The PC fiber optic connector of claim 15, wherein said connector envelope has mounting features sized and shaped to correspond to an ST-type connector.

18. The PC fiber optic connector of claim 15, wherein said connector envelope has mounting features sized and shaped to correspond to an MT-type connector.

19. A method of forming a terminus for a fiber optic cable comprising:
removing an outer layer of a fiber optic cable to expose a section of optical fiber;
inserting the optical fiber into a bore at a first end of a ferrule;
passing the optical fiber to a point proximate a second end of the ferrule;
applying an epoxy to the end of the optical fiber proximate the second end of the ferrule;
attaching a lens to the end of the optical fiber proximate the second end of the ferrule; and
inspecting the status of the epoxy at the lens and optical fiber junction through a slot formed in the ferrule.

20. The method of claim 19, wherein said inspecting step is accomplished by using a scope.

21. The method of claim 19, wherein said step of attaching the lens to the end of the optical fiber includes seating the lens into a recess formed in the second end of the ferrule, such that the lens does not protrude past a plane of the second end of the ferrule.

22. The method of claim 19, further comprising:
inserting the optical fiber into a sleeve prior to inserting the optical fiber into the bore; and
applying an epoxy proximate the sleeve at the first end of the ferrule to secure a strength member of the fiber optic cable to the terminus.

23. The fiber optic cable apparatus of claim 1, further comprising:
an inspection slot formed in said ferrule proximate said second end which affords a view of the attachment between said lens and said optical fiber.

24. The fiber optic cable apparatus of claim 13, wherein said lens has a diameter of between about 200 to 500 um.

25. The fiber optic cable apparatus of claim 1, wherein said lens has an index of refraction value of about 1.7 and said optical fiber has an index of refraction value of about 1.46 to 1.49.

26. The fiber optic cable apparatus of claim 1, wherein an index of refraction value of said lens is at least about 14% greater than an index of refraction value of said optical fiber.

* * * * *